O. H. & A. F. PIEPER.
HOT AIR SYRINGE.
APPLICATION FILED OCT. 4, 1915. RENEWED APR. 24, 1917.
1,252,614.
Patented Jan. 8, 1918.
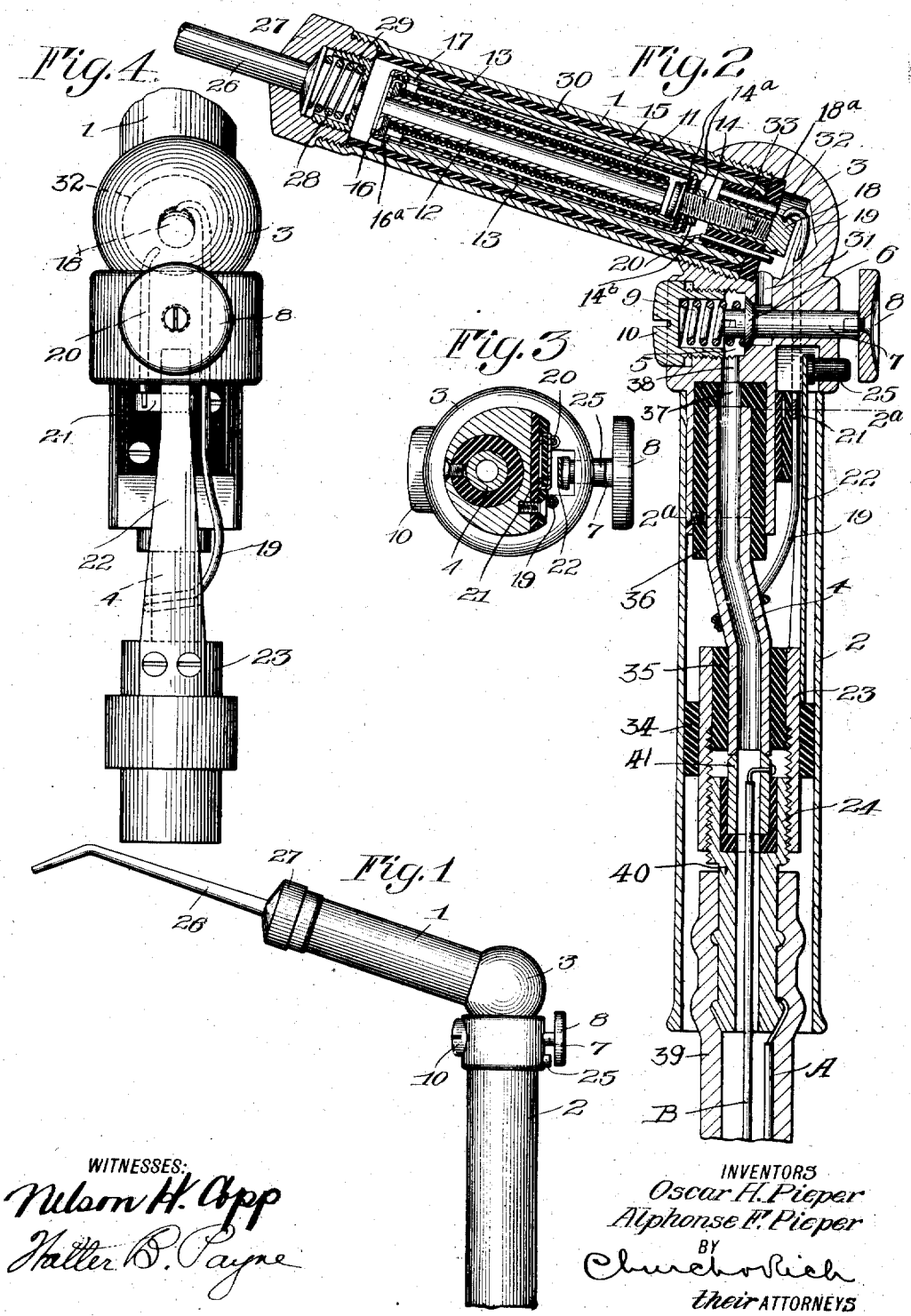

UNITED STATES PATENT OFFICE.

OSCAR H. PIEPER AND ALPHONSE F. PIEPER, OF ROCHESTER, NEW YORK.

HOT-AIR SYRINGE.

1,252,614. Specification of Letters Patent. Patented Jan. 8, 1918.

Application filed October 4, 1915, Serial No. 53,951. Renewed April 24, 1917. Serial No. 164,280.

*To all whom it may concern:*

Be it known that we, OSCAR H. PIEPER and ALPHONSE F. PIEPER, both of Rochester, in the county of Monroe and State of New York, have invented certain new and useful Improvements in Hot-Air Syringes; and we do hereby declaring the following to be a full, clear, and exact description of the same, reference being had to the accompanying drawings, forming a part of this specification and to the reference-numerals marked thereon.

Our invention has for its purpose to improve the construction of hot air syringes of the type that is employed in dental work, and embodying generally a valve controlled supply of fluid under pressure, and an electrical heating unit for warming the air before it reaches the discharge point of the instrument, and more particularly the improvement consists in novel and readily controlled devices, whereby the heating unit is rendered effective when the fluid valve is opened, and vice versa. Further, the invention contemplates the provision of means for heating the air more thoroughly by subjecting it to a maximum effect from the heating unit.

Arranged in the casing 1 is a removable heating unit, or element, which preferably consists of inner and outer tubular walls 12 and 13 fastened together in spaced relation, the outer tube being closed at one end, while the inner tube is opened at both ends, and, in the present instance, is connected to the outer tube at the open end of the latter by a wall, or plate, 16. This plate is preferably connected to the outer tube by expanding the open end of the latter slightly to receive the plate and then forming the projecting end of the tube over the plate. The enlargement $16^a$ thus produced at the outer end of the tube 13 engages a tube 15 secured at its inner end to an insulating member $18^a$, which is seated within the intermediate section, or head, 3, and held therein by engagement with the inner end of the threaded casing 1. A heating coil 11 surrounds the inner tube 12, one end of the coil being connected to the plate 16 and the other end to an attaching member, or screw, 14, which passes through the closed end of the outer tube and is insulated therefrom by washer $14^a$ and secured by a nut $14^b$.

The heating element, or unit, is held firmly in place with the enlarged end $16^a$ in engagement with the outer end of the tube 15 by means of the screw 14, which engages within a threaded securing member 18 carried by the insulating member $18^a$. The tubes 13 and 15 are spaced from each other except where they contact at their outer ends, and the tube 13 is provided with perforations 17 adjacent the enlargement $16^a$ in order that air admitted within the tube 15 may pass around the outer tube of the heating element, and after entering the perforations, pass between the inner and outer tube, thence within the inner tube to the outer end of the casing 1, escaping by a nozzle 26.

This nozzle is held within the cap 27 by means of a spring 28 engaging the base of the nozzle and retained in position by a threaded sleeve 29. An asbestos sleeve 30 is provided inside the casing 1 and adjacent thereto, in order to prevent the latter from becoming unduly heated from the heat that is generated by the coil 11.

It will be observed that, with current flowing in the heating coil, air admitted within the chamber 15 is subjected to a certain amount of heat radiating from the coil through the outer tube 13, while passing between the two tubes. After passing through the openings 17 the air comes in direct contact with the resistance coil until it reaches the inner end of the tube 12. Again, in passing within the latter tube the air is subjected to the heat radiating from the coil through said tube.

The instrument is adapted to be connected to an air pipe 39 leading to a source of compressed air, and to this end the handle 2 is provided with an air pipe attaching sleeve 23, internally threaded to receive the coupling member 24 on the end of the pipe. The member 24 carries a portion 41 adapted to seat against a tubular portion 4 carried by the sleeve 23, to make an air tight joint, and the air passage in the portion 4 communicates with a passage 38 in the head 3, leading to the valve chamber 5.

Upon opening the valve 6 air is allowed to flow through the air pipe 39 and tubular portion 4, past the valve, into a passage 31 in the head 3, and into a chamber 32 beneath the insulating member 18. A passage 33 in the latter communicates with the interior of the tube 15, so that the air admitted by the valve can enter said tube and be subjected to the action of the heating coil In order to enable the circuit through the coil 11 to be closed when the air is admitted, we provide a switch arm 22 which is actuated by a plunger 25 arranged beneath the valve thumb piece 8, and is adapted to engage with an insulated contact plate 21 connected by a wire 20 passing through a channel in the head 3 leading to the chamber 32 and through an aperture in the insulating block 18ª to the tube 15. The switch arm 22, which thus makes electrical contact through the tubes 15 and 13 to the plate 16 and one end of the heating coil 11, is carried by the air supply pipe attaching sleeve 23, the latter being insulated from the handle 2 by a sleeve 34 fitting within the latter. The sleeve 23 is provided with a central aperture to receive the tubular portion 4, which is insulated therefrom by a bushing 35.

The valve chamber 5 is in the present structure located at one side of the head 3, and the upper end of the tubular portion 4 is offset to communicate with the passage 38, leading to the valve chamber. The tubular portion is insulated from the head by a sleeve 36 tightly surrounding the tube and fitting within a recess in the head to make an air tight joint. An aperture 37 at the base of the sleeve allows the passage of air from the tube to the passage 38.

The member 4 is connected by a wire 19 leading through a channel in the head into the chamber 32 and attached to the sleeve 18, which latter makes electrical connection through the screw 14 to the inner end of the heating coil. Connection is made to an electric circuit by wires A and B, which lead within the air pipe 39, and are connected respectively to the outer and inner contact sleeves 40 and 41, which are insulated from each other, the former engaging the terminal sleeve 23, while the latter makes contact with the tubular member 4, which constitutes the other terminal of the instrument circuit. It will be observed that this construction affords a convenient means whereby the electrical and air connections of the instrument may be made simultaneously. When the thumb piece 8 of the valve is depressed the current passes from conductor A to contact 40, sleeve 23, switch arm 22, contact plate 21, wire 20, tube 15, heating coil 11, screw 14, sleeve 18, wire 19, tubular member 4, sleeve 41 and conductor B. At the same time air is admitted from the pipe 39 through the central passages in the contact sleeves 40 and 41 through member 4, to passage 38, valve chamber 5, and as before described past the heating coil escaping by the nozzle 26.

The structure which has been described is an exceedingly efficient one in dental work, and can be manufactured at a cost that is very reasonable, besides affording an exceedingly strong and rigid arrangement, which is admirably adapted for the fine, delicate class of instruments that are employed in dental work.

We claim as our invention:

1. In a hot air syringe, the combination with a heating coil and an electric circuit controlling it, of an inner tube within said coil, and an outer tube surrounding it closed at one end and connected at its opposite end with the inner tube by a wall, the outer tube having openings adjacent the last mentioned wall whereby the incoming air is caused to pass around the outside of the outer tube, thence interiorly thereof in engagement with the heating coil, and thence within the inner tube and lengthwise thereof.

2. In a hot air syringe, the combination with a head having a recess and provided with an integral portion forming a handle having an air passage therein communicating with the recess, and a valve controlling the flow of air therein, of a tubular air conducting portion fitted in the recess, an electric heating element in said air conducting portion and circuit conductors for said heating element inclosed within the handle and head.

3. In a hot air syringe, the combination with a head, a nozzle portion on the head, a heating element located therein, and a handle portion carrying the head having an air passage therein and provided with a threaded attaching portion concentric with said passage, of a pipe connection coöperating with said threaded portion and comprising a part adapted to form a tight joint with the end of the air passage.

4. In a hot air syringe, the combination with a head, a nozzle portion thereon, an electric heating element located in said nozzle portion and a metallic handle portion carrying the head provided with an air passage, of a threaded metal sleeve concentric to the air passage and insulated from the handle portion, a metal air pipe connection having threaded engagement with said sleeve and provided with an insulated metal tube fitting against the end of the air passage, said connection and its tube forming the two sides of an electric circuit, and circuit connections between the parts of the handle and the heating element.

5. In a hot air syringe, the combination with a body portion having an air passage therein and a valve for controlling the flow of air therethrough, of a heating coil, a sleeve insulated from the body portion and forming one terminal of the coil, a tubular member carried by and insulated from the sleeve forming the other terminal, and an insulation interposed between the body portion and tubular member, the passage in the tubular member communicating with the passage in the body portion through an aperture in the insulating member.

6. In a hot air syringe, the combination with a body portion having an air passage therein and a valve for controlling the flow of air therethrough, of a heating coil, an air supply pipe attaching sleeve insulated from the body and forming one terminal of the coil, a tubular member carried by the sleeve and insulated therefrom and from the body portion constituting the other terminal, the passage in the tubular member communicating with that in the body, and an air supply pipe connection having outer and inner sleeves insulated from each other and contacting respectively with the attaching sleeve and tubular portion, the two sleeves being adapted to be connected to the terminals of an electric circuit.

7. In a hot air syringe, the combination with a heating element embodying outer and inner walls forming air passages and a heating coil in one of the air passages, of a tube surrrounding the heating element and engaging the outer end of the latter but spaced therefrom the remainder of its length, the outer wall of the heating element having an opening adjacent its outer end whereby air passing between the tube and heating element is admitted to the air passages and heating coil.

8. In a hot air syringe, the combination with a heating element embodying outer and inner walls forming air passages and a heating coil in one of the air passages, of a tube surrounding the heating element in spaced relation, an enlargement at the outer end of the heating element engaging the end of the tube to make an air tight joint, and means for holding the heating element and tube in engagement, the outer wall of the heating element having an opening adjacent the enlargement whereby air passing between the tube and heating element is admitted to the air passages and heating coil.

9. In a hot air syringe, the combination with a tube and an insulated securing portion at one end thereof, each adapted to be connected to terminals of an electric circuit, of a removable heating element within tube in contact therewith, having an insulated attaching portion coöperating with the insulated securing portion, and a heating coil within the heating element in electrical contact therewith and with the attaching portion, and means for controlling the admission of air through the heating element and past the heating coil.

10. In a hot air syringe, the combination with a body having an air passage therein and a valve for controlling the flow of air therethrough, of an air pipe attaching sleeve insulated from the body portion, a tubular portion carried by the sleeve and insulated therefrom and from the body portion having an air passage therethrough communicating with the air passage in the body portion, the sleeve and tubular portion constituting contact members adapted to be connected to the terminals of an electric circuit, a tube carried by the body portion, an insulated securing portion at one end thereof, electrical conductors connecting the two last named members with the contact members, a removable heating element within the tube in contact therewith, having an insulated attaching portion coöperating with the insulated securing portion, a thermo coil within the heating element connected at one end thereto and at the other with the attaching portion, and a switch in one of the conductors controlled by the valve.

11. In a hot air syringe, the combination with a body portion having an air passage therein and a valve for controlling the flow of air therethrough, of a heating coil, a sleeve insulated from the body portion, a tubular portion carried by the sleeve and insulated therefrom and from the body portion, having an air passage therethrough communicating with the air passage in the body portion, the sleeve and tubular portion constituting contact members adapted to be connected to the terminals of an electric circuit, an insulated switch member on the body portion, conductors leading from the opposite ends of the coil to said switch member and one of the contact members respectively, and a coöperating switch member on the other contact member, one of the switch members being controlled by the valve and adapted to make contact with the other when the valve is opened.

OSCAR H. PIEPER.
ALPHONSE F. PIEPER.

Witnesses:
R. M. WRIGHT,
F. I. WILSON,
V. R. HUMPHREYS,
J. H. KLINE.

Copies of this patent may be obtained for five cents each, by addressing the "Commissioner of Patents, Washington, D. C."